US009992807B2

(12) United States Patent
Balachandran et al.

(10) Patent No.: US 9,992,807 B2
(45) Date of Patent: Jun. 5, 2018

(54) METHOD AND APPARATUS FOR IMPROVED MOBILE COMMUNICATIONS IN HETEROGENEOUS WIRELESS NETWORKS

(75) Inventors: Krishna Balachandran, Morganville, NJ (US); Joseph H. Kang, Belle Mead, NJ (US); Kemal M. Karakayali, Highland Park, NJ (US); Kiran M. Rege, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 13/106,825

(22) Filed: May 12, 2011

(65) Prior Publication Data
US 2012/0289231 A1 Nov. 15, 2012

(51) Int. Cl.
*H04W 76/00* (2018.01)
*H04W 76/02* (2009.01)
*H04W 36/00* (2009.01)
*H04W 36/04* (2009.01)

(52) U.S. Cl.
CPC ..... *H04W 76/025* (2013.01); *H04W 36/0083* (2013.01); *H04W 36/0061* (2013.01); *H04W 36/04* (2013.01)

(58) Field of Classification Search
CPC ..... H04W 36/08; H04W 36/14; H04W 48/16; H04W 76/00; H04W 36/0005; H04W 36/0061; H04W 48/20; H04W 52/40; H04W 84/045
USPC ....... 455/445, 426.1, 552.1, 553.1, 436–444; 370/331
See application file for complete search history.

(56) References Cited

U.S. PATENT DOCUMENTS

| 5,907,542 A * | 5/1999 | Kuehnel et al. ............. 370/331 |
| 2003/0114114 A1* | 6/2003 | Itoh ............................... 455/69 |
| 2005/0221831 A1* | 10/2005 | Pecen et al. .................. 455/445 |
| 2008/0039144 A1* | 2/2008 | Pan et al. ...................... 455/561 |
| 2008/0123596 A1* | 5/2008 | Gallagher et al. ........... 370/331 |
| 2008/0220787 A1* | 9/2008 | Stanwood ............... H04B 7/02 455/450 |
| 2008/0316968 A1* | 12/2008 | Sun et al. ..................... 370/331 |
| 2009/0310563 A1* | 12/2009 | Chou et al. ................... 370/331 |
| 2010/0075678 A1* | 3/2010 | Akman et al. ............... 455/436 |
| 2010/0130219 A1* | 5/2010 | Cave et al. ................... 455/450 |

(Continued)

FOREIGN PATENT DOCUMENTS

WO    WO/2010/019803    2/2010

OTHER PUBLICATIONS

Motorola: "Coordinated Multi-PointTransmission—Exploring Possible System Operations and UE Support", 3G P P Draft Nov. 5, 2008, XP050317669, Chapter 3.

(Continued)

*Primary Examiner* — Daniel Lai
(74) *Attorney, Agent, or Firm* — Harness, Dickey & Pierce, P.L.C.

(57) ABSTRACT

Various methods and devices are provided to address the need for improved mobile communications in heterogeneous networks. In one method, an anchor-cell transceiver node communicates with a mobile device via a primary link. The anchor-cell transceiver node conveys information for the mobile device to the mobile device by routing at least a portion of the information to the mobile device via a secondary-cell transceiver node.

11 Claims, 4 Drawing Sheets

(56) References Cited

U.S. PATENT DOCUMENTS

2011/0040888 A1* 2/2011 Krishnaswamy et al. .... 709/231
2014/0013392 A1* 1/2014 Vikberg .............. H04L 63/0281
  726/3

OTHER PUBLICATIONS

Qualcomm Inc: "Timer Based De-Activation ofSecondary Carrier in Dual-B and DC-HSDPA" 3G P P Draft Feb. 16, 2010, XP050418823, Chapters 1 and 6.
K. Balachandran et al: "Seamless Macro-Cell Anchored Radio Transmission for Enhanced Downlink Performance in Heterogeneous Networks", ICCCN, Jul. 31, 2011, pp. 1-5, XP032049137.
PCT/US2012/037418, Notification ofTransmittal of the International Searth Reportand the Written Opinion of the Intl Searching Authority, or the Declaration.

* cited by examiner

METHOD AND APPARATUS FOR IMPROVED MOBILE COMMUNICATIONS IN HETEROGENEOUS WIRELESS NETWORKS

FIELD OF THE INVENTION

The present invention relates generally to communications and, in particular, to mobile communications in heterogeneous wireless networks.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

The rapidly increasing demand for mobile data applications coupled with limited licensed spectrum availability has led to significant interest in the deployment of heterogeneous networks comprising mixtures of macro-cells and small cells operating in the same spectrum. Such networks often exhibit relatively poor performance on the downlink because of the interference caused by macro-cell transmissions to those from small cells. Judicious resource partitioning schemes have been shown to mitigate the interference problem, leading to significant improvement in the edge and median throughput in heterogeneous networks. However, it is, typically, only static or near-static users that can avail of this improvement; users with a high degree of mobility do not benefit from the high bandwidth made available by the heterogeneous networks because of the following reason: They are either forced to remain connected to macro-cells in order to avoid frequent handoffs, which means they cannot make use of the extra bandwidth that is typically available only with the small cells, or, if they are allowed to connect to small cells, the frequent handoffs that ensue preclude their getting a consistently high level of throughput. Consequently, there is likely to be a clear difference in the quality of experience for static (or near-static) users and highly mobile users of heterogeneous networks.

The best known solution to avoid the frequent hard handoffs between different base stations is to permit soft handoffs where a mobile user maintains links with multiple base stations at the same time. If a mobile user is in soft handoff with a set of base stations, downlink transmissions to the mobile user are carried synchronously (in an identical manner) by all of the base stations involved in the soft handoff. In such an arrangement, the performance associated with the downlink connection to the mobile user is more-or-less determined by the base station that has the strongest link to the mobile user. While soft handoff may alleviate some of the problems experienced by highly mobile users, it has several limitations. For example, soft handoffs are not available in several networks, e.g. those based on the 3GPP LTE standard. Also, they typically lead to a loss of capacity for data-oriented networks since they require multiple base stations to carry replicas of the same data. Finally, if resources are partitioned between macro-cells and small cells in order to avoid certain interference-related problems, it will not be possible to implement soft handoffs between macro-cells and small cells. Taking all of these points into account, it is clear that soft handoffs do not offer a viable solution to the problem being addressed.

Thus, new solutions and techniques that are able to enable even highly mobile users of heterogeneous networks to experience improved performance would meet a need and advance wireless communications generally.

Figure 1:
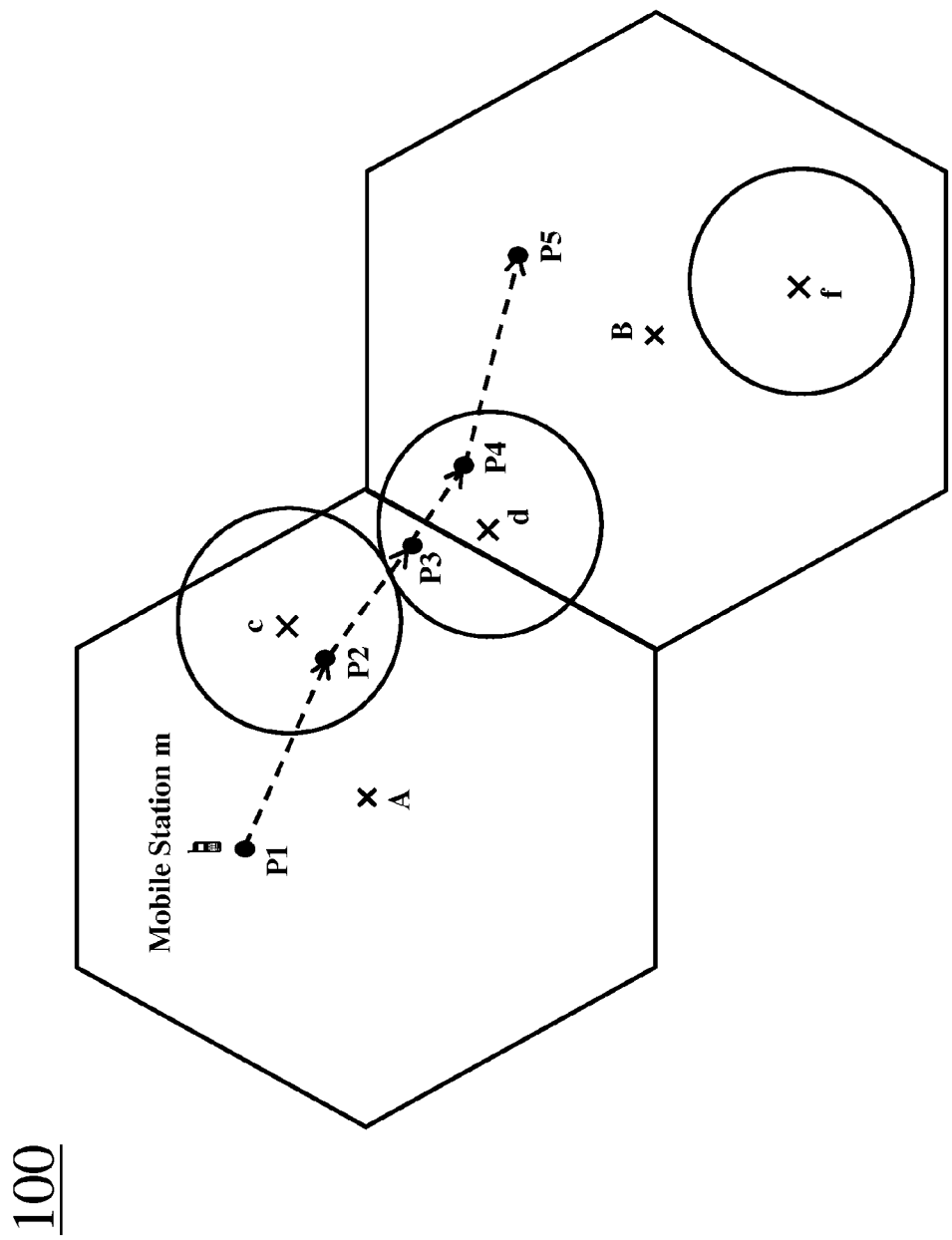
FIG. 1 is a block diagram depiction of a heterogeneous wireless network in accordance with multiple embodiments of the present invention.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, subdivided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods and devices are provided to address the need for improved mobile communications in heterogeneous networks. In a first method, an anchor-cell transceiver node communicates with a mobile device via a primary link. The anchor-cell transceiver node conveys information for the mobile device to the mobile device by routing at least a portion of the information to the mobile device via a secondary-cell transceiver node. An article of manufacture is also provided, the article comprising a processor-readable storage medium storing one or more software programs which when executed by one or more processors performs the steps of the first method.

Many embodiments are provided in which the first method is modified. For example, in many embodiments, the anchor-cell transceiver node also instructs the secondary-cell transceiver node and the mobile device to establish a secondary link for a period of time until expiration. To prevent expiration, the anchor-cell transceiver node may send a refresh indication for the secondary link to the secondary-cell transceiver node and the mobile device. The anchor-cell transceiver node may also trigger the secondary-cell transceiver node and the mobile device to handoff to a new secondary-cell transceiver node. In many embodiments, the anchor-cell transceiver node performs Radio Link Control (RLC) processing for both the primary link and also a secondary link between the secondary-cell transceiver node and the mobile device. Depending on the embodiment, the anchor-cell transceiver node, may also perform Hybrid Automatic Repeat request (HARQ) processing for the primary link and the secondary link.

In a second method, a secondary-cell transceiver node receives from an anchor-cell transceiver node information for a mobile device, the anchor-cell transceiver node having a primary link with the mobile device. The secondary-cell transceiver node transmits the information to the mobile device. An article of manufacture is also provided, the article comprising a processor-readable storage medium storing one or more software programs which when executed by one or more processors performs the steps of the second method.

Many embodiments are provided in which the second method is modified. For example, in many embodiments, the secondary-cell transceiver node is a candidate secondary-cell transceiver node for the mobile device. In other embodiments, the secondary-cell transceiver node receives from the anchor-cell transceiver node an indication for the secondary-cell transceiver node and the mobile device to establish a secondary link for a period of time until expiration. The secondary-cell transceiver node may also receive a refresh indication for the secondary link from the anchor-cell transceiver node. Further, the secondary-cell transceiver node may receive from the anchor-cell transceiver node an indication for the secondary-cell transceiver node and the mobile device to handoff to a new secondary-cell transceiver node. In many embodiments, the secondary-cell transceiver node communicates with the anchor-cell transceiver node to support Radio Link Control (RLC) processing at the anchor-cell transceiver node for a secondary link between the secondary-cell transceiver node and the mobile device. In some embodiments, the secondary-cell transceiver node performs all physical layer processing for a secondary link between the secondary-cell transceiver node and the mobile device. While in other embodiments, the secondary-cell transceiver node communicates with the anchor-cell transceiver node to support Hybrid Automatic Repeat request (HARQ) processing at the anchor-cell transceiver node for the secondary link between the secondary-cell transceiver node and the mobile device.

In a third method, a mobile device communicates with an anchor-cell transceiver node via a primary link and with a secondary-cell transceiver node via a secondary link. The mobile device receives primary-link information via the primary link and secondary-link information via the secondary link, the primary-link information being different than the secondary-link information. An article of manufacture is also provided, the article comprising a processor-readable storage medium storing one or more software programs which when executed by one or more processors performs the steps of the third method.

Many embodiments are provided in which the third method is modified. For example, in many embodiments, the mobile device may receive the primary-link information and secondary-link information at the same time. In some embodiments, the mobile device monitors a candidate set of secondary-cell transceiver nodes for possible communications from any of the candidate secondary-cell transceiver nodes. In other embodiments, the mobile device receives from the anchor-cell transceiver node an indication for the mobile device and the secondary-cell transceiver node to establish the secondary link for a period of time until expiration. The mobile device may also receive a refresh indication for the secondary link from the anchor-cell transceiver node. Further, the mobile device may receive from the anchor-cell transceiver node an indication for the secondary-cell transceiver node and the mobile device to handoff to a new secondary-cell transceiver node. Depending on the embodiment, the mobile device monitors both the primary link and the secondary link until the occurrence of at least one of the secondary link expires without being refreshed or the mobile device hands off to a new secondary link.

An anchor-cell transceiver node apparatus is also provided. The anchor-cell transceiver node being configured to communicate with other devices of a system and being operative to communicate with a mobile device via a primary link and to convey information for the mobile device to the mobile device by routing at least a portion of the information to the mobile device via a secondary-cell transceiver node. Many embodiments are provided in which this anchor-cell transceiver node is modified. Examples of such embodiments can be found described above with respect to the first method.

A secondary-cell transceiver node apparatus is also provided. The secondary-cell transceiver node being configured to communicate with other devices of a system and being operative to receive from an anchor-cell transceiver node information for a mobile device, the anchor-cell transceiver node having a primary link with the mobile device. The secondary-cell transceiver node is further operative to transmit the information to the mobile device. Many embodiments are provided in which this secondary-cell transceiver node is modified. Examples of such embodiments can be found described above with respect to the second method.

A mobile device apparatus is also provided. The mobile device being configured to communicate with other devices of a system and being operative to communicate with an anchor-cell transceiver node via a primary link and with a secondary-cell transceiver node via a secondary link. The mobile device is further operative to receive primary-link information via the primary link and secondary-link information via the secondary link, the primary-link information being different than the secondary-link information. Many embodiments are provided in which this mobile device is modified. Examples of such embodiments can be found described above with respect to the third method.

DETAILED DESCRIPTION OF EMBODIMENTS

To provide a greater degree of detail in making and using various aspects of the present invention, a description of our approach to improving mobile communications in heterogeneous networks and a description of certain, quite specific, embodiments follows for the sake of example. FIGS. 1-4 are referenced in an attempt to illustrate some examples of specific embodiments of the present invention and some of the specific problems that they may address.

The basic concept underlying the present approach is called Seamless Macro-cell Anchored Radio Transmission (SMART). A mobile device supporting a SMART connection maintains a link with a macro-cell, which acts as its anchor. The link between the mobile device and its anchor macro cell is referred to as its primary link. In addition, if the mobile device finds itself in the vicinity of a small cell, it can, optionally, have a secondary link with the small cell. Both the primary and secondary links support bearer traffic as well as control traffic. The decision as to whether a mobile device should be allowed to have a secondary link and when it should be torn down is made by the device's anchor cell. The radio resources (e.g., blocks spread over time and frequency) are assumed to be suitably partitioned between macro-cells and small cells so that there is no interference between the downlink transmissions of the macro-cells and small cells. (While this is not absolutely essential for the viability of this approach, it makes its implementation easier.)

The mobile device frequently measures the received signal strengths (or, alternatively, signal to noise plus interference ratios (SINRs)) associated with neighboring cells and reports them to its primary (i.e., anchor) cell. Based on this report, if the primary cell finds the conditions suitable, it sends control messages to the mobile device and the strongest small cell reported by the mobile device to form a secondary link for a certain period of time. Until the expiry of this time period, the mobile device continues to monitor the control and data channels associated with this secondary link in addition to those associated with its primary link to its anchor cell. Also, during this period, the anchor cell can direct some or all of the downlink data intended for the mobile device to be delivered via the small cell participating in the secondary link (i.e., the secondary cell). Actual scheduling and transmission of this data is done independently by the secondary cell. Note that a mobile having a secondary link does not preclude its anchor cell from transmitting some of its downlink data over the primary link. Thus, a mobile device having a primary and a secondary link needs to simultaneously monitor the control and data channels associated with these two links.

The mobile device continues to measure and report the received signal strengths associated with neighboring cells at all times. If the conditions remain suitable for maintaining the secondary link, the primary (anchor) cell extends the duration of the secondary link by sending refresh messages to the mobile device and secondary cell. If it finds that a different small cell is better suited to form a secondary link with the mobile device, it effects a "secondary handoff" by sending appropriate messages to the mobile device, its existing secondary cell and the new secondary cell. If the primary cell finds that the current secondary link has become too weak with no suitable replacement, it allows the secondary link to expire by refraining from sending any refresh messages to the mobile device and its current secondary cell. Finally, if the primary cell finds that a different macro-cell is better suited to act as the primary cell of the mobile device, it initiates a "primary handoff" which is similar to hard handoffs in typical cellular networks.

An important goal of this approach is to keep the secondary link establishment and handoff procedures as lightweight as possible. This allows mobile devices to opportunistically make use of the extra bandwidth available at small cells. In order to make secondary handoff procedures lightweight, Radio Link Control (RLC) and all of the relevant higher layers of the communication protocol associated with the primary as well as the secondary links are terminated at the anchor cell. Moreover, in one of the embodiments of the present invention even the higher level functions (e.g., Hybrid Automatic Repeat request or HARQ) of the physical layer for the primary and secondary links are terminated at the anchor cell. (In a different embodiment the entire physical layer of the protocol for the secondary link is terminated at the secondary cell.) This results in more efficient secondary handoff procedures, reducing the delays involved in setting up or tearing down secondary links.

Simulation studies have shown that mobile devices with the capability for SMART connections may display more than a 100% gain in their edge throughput as compared to ordinary devices that maintain links with a single cell at a time. Further doubling of gains in edge throughput is possible if judicious restrictions are placed on the use of primary links by SMART mobiles that have strong secondary links.

The wireless network 100 of FIG. 1 comprises two macro-cells, A and B, whose coverage areas have been illustratively represented by hexagons centered at the corresponding base stations (cells). The network additionally comprises the small cells c, d and f, whose coverage areas have been represented by (small) circles with centers located at the corresponding base stations (cells). FIG. 1 also depicts a mobile station, m, which at different points in time is shown to be located at points P1, P2, P3, P4, and P5.

Mobile station m is at point P1 when it establishes a connection with the wireless network using a standard procedure similar that used in wireless networks conforming to the 3GPP LTE standard, for example. The connection establishment procedure includes measuring the received signal strengths associated with different base stations (cells) in the neighborhood of the mobile station, selecting the one that corresponds to the strongest received signal, and connecting to that cell by exchanging a few control messages with it. The only difference in the case of mobile station m, which is capable of supporting a SMART connection, is the following: Whereas an ordinary mobile station selects the cell that corresponds to the strongest received signal regardless of whether it is a macro-cell or a small cell, a mobile station with SMART capability restricts itself to macro-cells only when it first establishes a connection with a wireless network, i.e., it selects the macro-cell with the strongest received signal and connects to it. Thus, in the present example, mobile station m, when it attempts to connect to the wireless network at point P1, selects macro-cell A, which corresponds to the strongest received signal, and establishes a connection with it. Macro-cell A becomes the primary cell (also referred to as the anchor cell) of mobile m; the connection between mobile station m and macro-cell A is referred to as the primary link.

Figure 2:
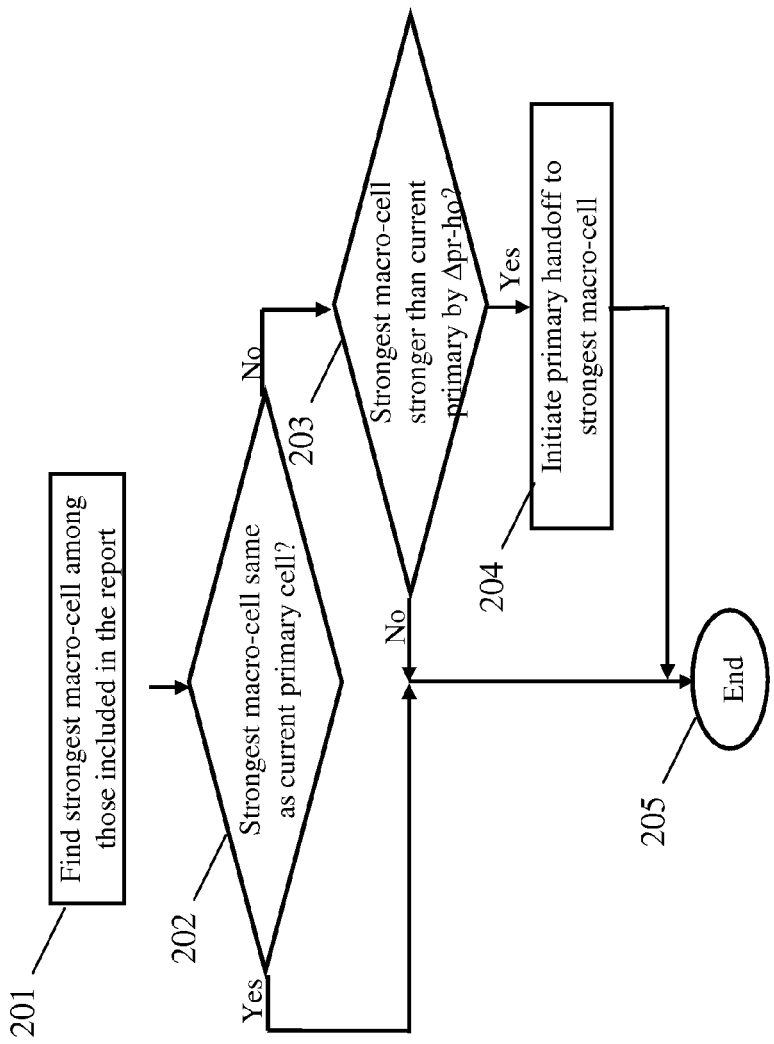
FIG. 2 is a logic flow diagram of functionality involved in determining whether to perform a macro-cell handoff in accordance with various embodiments of the present invention.

Logic flow diagram 200, of FIG. 2, illustrates logic that may be used by macro-cell A to decide if a primary handoff needs to be initiated. Even after establishing its primary link with macro-cell A, mobile station m continues to periodically measure the received signal strengths associated with all cells (macro-cells as well as small cells) in its neighborhood and report them to its primary cell, macro-cell A. (We will assume that the signal strengths included in the report are in units of dBm.) Whenever such a report is received (201), macro-cell A compares the reported signal strength associated with itself with those reported signal strengths associated with the rest of the macro-cells included in the report. If (202) the macro-cell associated with the strongest reported signal strength is different from that associated with itself (i.e., macro-cell A) and if (203) the former exceeds the latter by more than $\Delta_{pr\text{-}ho}$dB, it initiates (204) a primary handoff to the macro-cell associated with the strongest reported signal strength. Instead of initiating a primary handoff on the first instance when the reported signal strength for a macro-cell (say, macro-cell B) exceeds that associated with itself by the threshold amount, macro-cell A may choose wait for a certain amount of time to ensure that the reported signal strength for B continues to exceed that associated with itself before initiating a primary handoff to macro-cell B. Such a wait is likely to reduce the likelihood of the primary link flip-flopping between macro-cells A and B. Otherwise (205), it sees no need to make the strongest reported macro-cell to act as the primary cell of mobile station m.

Figure 3:
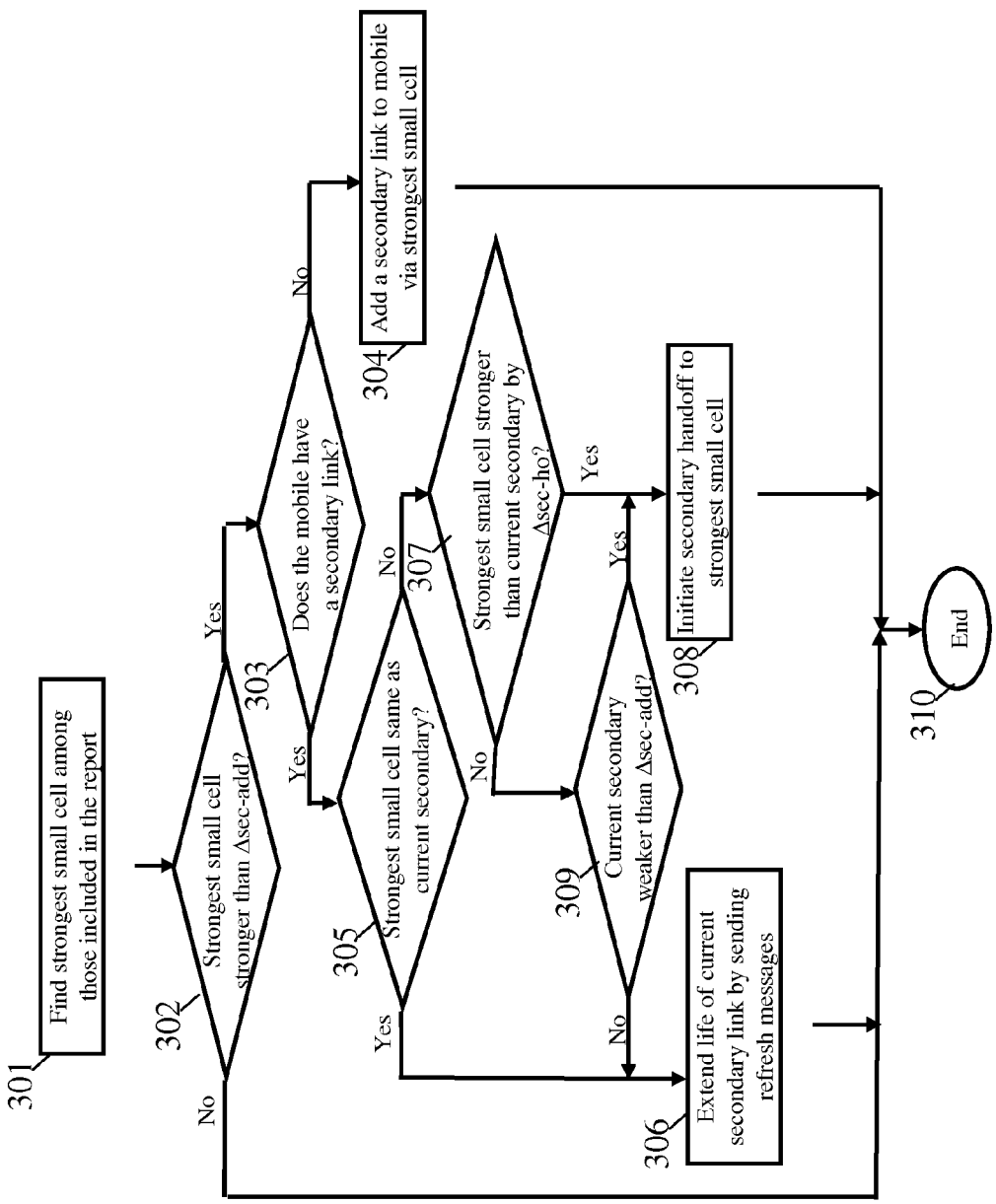
FIG. 3 is a logic flow diagram of functionality involved in determining whether to perform a small-cell handoff in accordance with certain embodiments of the present invention.

After testing for primary handoffs as described, macro-cell A carries out a comparison of the received signal strengths associated with small cells included in the report. Logic flow diagram 300, of FIG. 3, illustrates logic that may be used to compare the reported received signal strengths associated with small cells. In accordance with this logic, if the strongest received signal strength (301) associated with a small cell as reported by mobile station m is less than (302) the threshold value $\Delta_{sec\text{-}add}$, the macro-cell A does not take any action (310). Otherwise (i.e., the strongest signal strength associated with a small cell exceeds the threshold value $\Delta_{sec\text{-}add}$), it carries out the following actions.

If the mobile station m does not have a secondary link (303), it decides to add a secondary link (304) between the mobile station m and the small cell associated with the strongest reported signal strength. If the mobile station m already has a secondary link, macro-cell A compares (305) the identity of the small cell associated with the strongest received signal strength (say, y) with the mobile station's current secondary cell (say, x). If the two are identical, it sends refresh messages (306) to the mobile station m and its current secondary cell (cell x) to extend the duration for which the secondary link is to be kept. If the small cell y associated with the strongest received signal strength is different from the mobile station's current secondary cell (x), macro-cell A compares (307) the difference between the signal strength associated with cells y and x with a threshold value $\Delta_{sec\text{-}ho}$ dB. If the difference exceeds $\Delta_{sec\text{-}ho}$ dB, it initiates a secondary handoff (308) to small cell y by sending appropriate control messages to mobile station m and small cells x and y. If this difference is smaller than the threshold value $\Delta_{sec\text{-}ho}$ dB, macro-cell A compares (309) the signal strength associated with its current secondary cell (i.e., cell x) with the threshold $\Delta_{sec\text{-}add}$ dBm. If the signal strength associated with cell x is less than $\Delta_{sec\text{-}add}$ dBm, macro-cell A initiates a secondary handoff (308) to small cell y by sending appropriate control messages to mobile station m and small cells x and y; otherwise, i.e. if the signal strength associated with cell x is greater than $\Delta_{sec\text{-}add}$ dBm, it extends the duration of the current secondary link between small cell x and mobile station m by sending refresh messages (306) to both.

Returning to the example illustrated in wireless network 100 of FIG. 1, after establishing a connection with macro-cell A (which becomes its primary cell), mobile station m moves from point P1 to P2. While moving, as described previously, it periodically measures the received signal strengths associated with all cells in its neighborhood and reports them to its primary cell, i.e., macro-cell A. Each time such a report is received, macro-cell A compares the reported signal strengths using the logic described above. At some point near point P2, the received signal strength associated with small cell c exceeds the threshold value $\Delta_{sec\text{-}add}$ dBm while those associated with all other small cells are much lower. Consequently, in accordance with the logic depicted in logic flow diagram 300, macro-cell A decides to establish a secondary link between small cell c and mobile station m. It establishes the secondary link by sending appropriate control messages to small cell and mobile station m. The control message(s) to the mobile station m are sent over the control channel associated with the primary link between macro-cell A and mobile station m, while those meant for the small cell selected to provide the secondary link are sent over the backhaul connections between the macro-cell and the small cell. After mobile station m acknowledges receipt of the control message sent by macro-cell A, the latter may send a control message to small cell c to indicate that the mobile station is now ready to communicate with it over the secondary link. The control message (s) sent by macro-cell A to mobile station m during the establishment of the secondary link carry the information the mobile station would need in order to communicate over the secondary link. This information may include, for example, the identifier of the secondary cell (i.e., small cell c in the current example), hopping sequences that may be used by the latter, and so on.

Mobile station m continues to move from point P2 to point P3. All the while, it periodically measures the received signal strengths associated with all cells in its neighborhood and report them to its primary cell A. Somewhere between points P2 and P3, the reported measurements indicate that the received signal strength associated with small cell d exceeds that associated with mobile m's current secondary cell (i.e. small cell c) by more than $\Delta_{sec\text{-}ho}$ dB. The received signal strength associated with macro-cell A is still the strongest among those associated with macro-cells. Therefore, when macro-cell A processes the reported measurements, it determines in accordance with the logic depicted in logic flow diagram 300 that the mobile needs to undergo a secondary handoff so that the secondary link between small cell c and mobile m is now replaced with a secondary link between small cell d and mobile m. In order to carry out the secondary handoff, macro-cell A sends control messages to mobile m, small cell c and small cell d, instructing small cell c to tear down its (secondary) link with mobile m, instructing small cell d to set up a (secondary) link with mobile m and instructing mobile m to replace its secondary link with small cell c with a secondary link with small cell d. These control messages are collectively referred to as secondary handoff messages. Once again, the information required for mobile m to communicate with small cell d may also be sent along with the control messages it receives from its primary cell (i.e., macro-cell A) during the secondary handoff.

Mobile station m now moves from point P3 to point P4, continuing to measure received signal strengths from neighboring cells and reporting them to its primary cell, i.e., macro-cell A. Somewhere between points P3 and P4, the reported signal strength associated with macro-cell B exceeds that associated with macro-cell A by more than the primary handoff threshold $\Delta_{pr\text{-}ho}$ dB. Then, in accordance with the logic depicted in logic flow diagram 200, macro-cell A decides to carry out a primary handoff for mobile m so that its primary link is now with macro-cell B (instead of macro-cell A). To that end, macro-cell A exchanges control messages with mobile station m and macro-cell B to inform them that macro-cell B should now act as the primary cell of mobile station m. A primary handoff is like a hard handoff that takes place in existing/emerging cellular networks, such as those based on the 3GPP LTE.

When a primary handoff takes place, the connection state for the primary and secondary (if the latter exists) links for the corresponding mobile station is transferred to the new primary cell so that all existing communications can proceed without interruption. Note that the connection state in the case of a SMART connection includes the identity and other relevant information associated with the secondary cell, if the mobile station involved in the primary handoff has a live secondary link. Thus, in the present example, when macro-cell A carries out a primary handoff for mobile station m, the connection state transferred to macro-cell B (the new primary cell) includes the identity and other relevant information concerning small cell d, which is the secondary cell of mobile station m at the time of the primary handoff. The control messages sent by macro-cell A to mobile station m and macro-cell B to carry out the primary handoff are collectively referred to as primary handoff messages. Once again, the information required for mobile m to communicate with macro-cell B, the new primary cell, may also be sent along with the control messages it receives from macro-cell A during the primary handoff. Note that macro-cell A also processes the received signal strengths associated with small cells when it receives the report from mobile station m. Since these indicate that received signal strength associated with the current secondary cell (small cell d) is adequate (i.e., greater than the threshold value $\Delta_{sec-add}$ dBm) and, according to the logic depicted in logic flow diagram 300, no other small cell should replace small cell d as the secondary cell of mobile station m, it extends the duration of mobile station m's existing secondary link by sending refresh messages to it and small cell d.

Finally, mobile station m moves from point P4 to point P5, continuing to measure received signal strengths from neighboring cells and reporting them to its current primary cell, i.e., macro-cell B. Somewhere in the course of this movement, the reported signal strength associated with small cell d, which is mobile station m's secondary cell falls below the threshold value $\Delta_{sec-add}$ dBm, with no other small cell showing up as a possible replacement in accordance with the logic depicted in logic flow diagram 300. In this case, macro-cell B, the current primary cell of mobile station m, lets the existing secondary link (between mobile station m and small cell d) expire at the end of its current duration by refraining from sending refresh messages to mobile station m and small cell d. Since macro-cell B is the strongest cell at this point, it sees no reason to effect a primary handoff in accordance with the logic depicted in logic flow diagram 300.

In the above description, a secondary link for a given mobile device is determined by the primary (anchor) cell and established only after explicit signaling from the primary cell to both the secondary cell and the mobile device. In various alternative embodiments, the primary cell may continue to determine which secondary cells to use for secondary transmission to the mobile device, but the primary cell does not explicitly signal this information to the mobile device. Rather, the mobile device, perhaps with help from the primary (anchor) cell, maintains a candidate list of secondary cells. Because the mobile device may receive transmissions from its primary cell and any of the candidate secondary cells, the mobile device will search across links to determine if there are any communications intended for itself. If a transceiver node is in the candidate set, then we assume that the mobile is capable of monitoring it for any data that may be sent via that node. The candidate set can change over time with mobility (e.g., primary link handoffs or adding/dropping of secondary links). The main advantage of this approach is in reducing the redirection signaling that may be needed to allow the mobile to monitor one or more secondary links as conditions related to load and/or channel quality vary. The tradeoff is additional complexity incurred at the mobile in monitoring nodes that may not be sending data.

Figure 4:
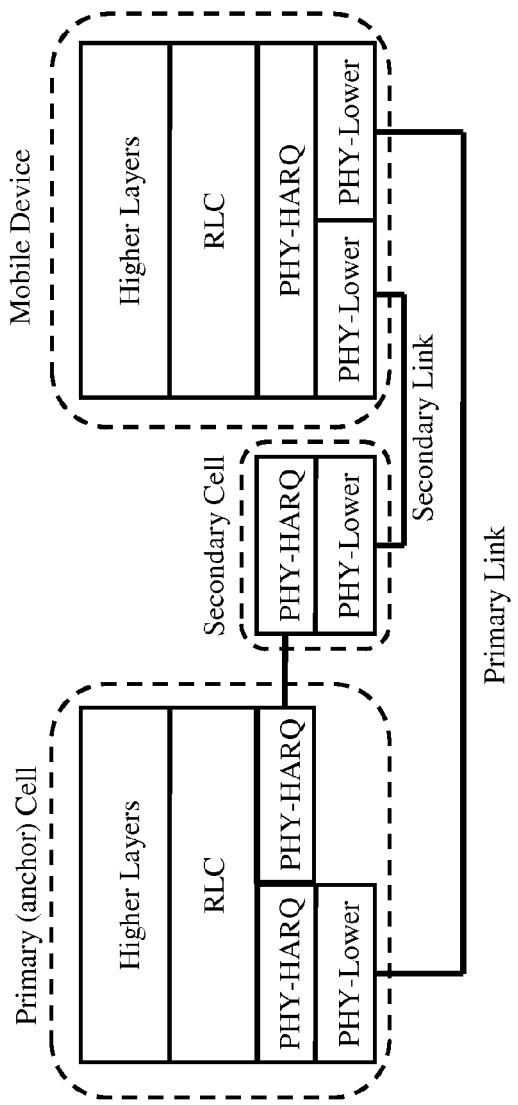
FIG. 4 is a block diagram depiction of a protocol stack in accordance with certain embodiments of the present invention.

We now describe various examples of how communications may take place over SMART connections. Since one of the driving ideas behind the concept of SMART connections is that the procedures for the establishment, tearing down, and handing over of secondary links be as light-weight as possible, we terminate most of the layers of the communication protocol stack at the primary (anchor) cell. Specifically, all layers of the protocol stack from the Radio Link Control (RLC) and above are terminated at the primary cell. Thus, all the radio bearer links essentially terminate at the primary cell. Since the primary handoffs are (relatively) rare, there is less need to disturb these links and move the associated state information between cells. Moreover, for all the active communication flows, a copy of the Hybrid Automatic Repeat Request (HARQ) state is also maintained at the primary cell. The actual scheduling, encoding and transmission of downlink data being transmitted over the secondary link is, of course, done by the secondary cell. Similarly, the secondary cell performs the following functions for the uplink data transmitted over the secondary link: sending transmission grant, receiving and decoding the data, and sending positive or negative acknowledgement. For encoding and decoding efficiency, the secondary cell also maintains the HARQ state for all uplink and downlink data transmitted over the secondary link. Whenever there is a change in the HARQ state for one or more data packets transmitted over the secondary link, the secondary cell informs the primary cell about that change so that the copy of the HARQ state maintained by the primary cell is in synch with the HARQ state at the secondary cell. For the data transmitted over the primary link, all the protocol layers are, naturally, maintained at the primary link. The mobile station, of course, terminates all of the protocol layers for the primary link as well as the secondary link. Diagram 400 of FIG. 4 illustrates this implementation of the communication protocol stack for SMART connections. (The term "PHY-lower" in diagram 400 refers to lower level physical layer functions such as scheduling, encoding/decoding, modulation, etc.)

We now briefly describe how one may implement the protocol stack shown in diagram 400 for secondary links. (For primary links, the implementation would follow standard practice since all protocol layers are terminated at the primary cell itself.) For downlink communications, one possible implementation of the protocol stack would be to place a small buffer at the secondary cell for RLC blocks. The PHY layer of the secondary cell can remove these blocks sequentially for transmission to the mobile station over the secondary link in accordance with its transmission schedule and prevailing channel conditions. It can select a Modulation and Coding Scheme (MCS) for transmitting these blocks based on the feedback it receives from the mobile station and transmit them accordingly. Whenever the secondary cell transmits RLC blocks in this manner, it stores some information in the form of a downlink "HARQ state" for possible future use (i.e., in case a retransmission is necessary.) The HARQ state includes information concerning the data that was transmitted as well as the MCS that was used to transmit the data. Whenever the secondary cell creates or modifies the HARQ state associated with a set of RLC blocks transmitted over the secondary link of a mobile station, it sends a copy of the HARQ state to the primary cell associated with the mobile station. Note that receiving an "ack" or a "nack" for a downlink transmission would result in a change in the corresponding HARQ state at the secondary cell. These changes, too, are conveyed to the primary cell so that the copy of the HARQ state maintained by the primary cell stays in sync with that at the secondary cell. When the contents of the buffer maintained by the secondary cell fall below a certain (lower) threshold value, it signals to the primary to send some more RLC blocks for downlink transmission. Similarly, if the contents of the RLC buffer exceed a different (upper) threshold value, the secondary cell tells the primary cell to stop sending RLC blocks for the time being.

As far as uplink transmissions on the secondary link are concerned, the secondary cell schedules these transmissions based on its own estimate of the channel conditions and the requests it receives from the mobile station. After scheduling uplink transmissions, the secondary cell sends transmission grants to the mobile station over the control channel associated with the secondary link. When the mobile station transmits data over the corresponding bearer channel, the secondary cell demodulates and decodes the transmitted data. If the data is successfully decoded, it sends an ack to the mobile station and passes the decoded data (in the form of RLC blocks) to the RLC layer in the primary cell. If the decoding attempt is unsuccessful, the secondary cell saves the HARQ state for use in subsequent decoding attempts and sends a "nack" to the mobile station. A copy of the saved HARQ state is also sent to the primary cell to keep the latter in sync.

Note that as shown in diagram 400, the RLC layer is implemented only in the primary cell and that it provides the appropriate protocol support to all data flows whether they are carried over the primary link or the secondary link. It is entirely up to the policies implemented in the network infrastructure to determine how the data flows should be distributed over the primary and secondary links associated with a given mobile. (These policies are executed by the primary cell.) For instance, these policies may require the primary cell to direct all (bearer) data entirely over the secondary link or entirely over the primary link or partially over the primary link and partially over the secondary link. In the last case, the division may be based on flow type so that certain connections (e.g. voice calls) may be directed over the primary link while others (e.g. best-effort data) may be directed over the secondary link. Alternatively, the primary cell may send some of the RLC blocks within each connection over the primary link while sending the rest over the secondary link. All of these and similar other variations of flow-directing strategies are consistent with embodiments of the present invention.

While all variations of flow-directing strategies such as those discussed above are consistent with embodiments of the present invention, we describe one which offers performance benefits when the objective is to improve the "edge performance" of network users. The edge performance is typically represented by the low percentiles of the bit-rates available to network users. Since all "SMART" mobile stations are attached to a macro-cell as their primary cell and macro-cells typically have a large coverage area, the number of mobile stations attached to a macro-cell is also typically large. Therefore, the bit-rate available to a mobile station from the macro-cell it is connected to can be rather meager if the cell's capacity is more or less equally distributed over all the mobile stations connected to it. Now many mobile stations connected to a macro-cell are also connected to a small cell as their secondary cell and receive very high bit-rates via their secondary links. In contrast, there are a few mobile stations that have either no secondary link or their secondary link is rather weak. It is these mobile stations whose bit-rates represent the edge performance of the cellular network. Therefore, in order to improve the bit-rate available to these "edge mobiles stations," we propose the following strategy: For each mobile station that has a secondary link, the mobile station's primary cell estimates the bit-rate available to it via the secondary link. (This may be done by keeping track of the data successfully delivered via the secondary link or may be obtained indirectly, by requesting the secondary cell.) If the estimated bit-rate available to the mobile station via its secondary link exceeds a threshold $R_{min}$ bits per second (bps), the primary cell directs all of the bearer data intended for the mobile station via its secondary link. Otherwise, it allows a share of the primary cell's capacity to be used for carrying some of the data intended for the mobile station. In this manner the macro-cell's capacity is used only to support mobile stations that have no secondary links or weak secondary links. As a result, the bit-rate available to these mobile stations increases substantially.

Many emerging mobile/wireless applications require high data-rates. Heterogeneous networks comprising layers of macro-cells and small cells have the capability to provide high data-rates simultaneously to a large number of mobile devices. However, such high data rates are typically available only if the mobile devices are connected to small cells. Consequently, a highly mobile user that undergoes frequent handoffs between small cells and macro-cells is unlikely to receive a high data-rate in a sustained manner; consequently, his quality of experience is likely to be unacceptable— particularly for the high-data-rate applications. Various embodiments of the present invention significantly expand the fraction of the highly mobile user population that can receive high data rates. In other words, various embodiments of the present invention may extend the high quality of experience to a much larger section of the user population than state-of-the-art solutions.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method of wireless communication comprising:
communicating, by an anchor-cell transceiver node with a mobile device, via a primary link;
instructing, by the anchor-cell transceiver node, a secondary-cell transceiver node and the mobile device to establish a secondary link for a period of time until expiration;
conveying, by the anchor-cell transceiver node, information for the mobile device to the mobile device, wherein conveying the information to the mobile device comprises,
    partitioning the information according to data type to produce a primary-link portion and a secondary-link portion of the information, and distributing the primary-link portion of the information to the primary link and the secondary-link portion of the information to the secondary link of the secondary-cell transceiver node, wherein both the primary link and the secondary link are concurrently active wireless links with the mobile device;
    transmitting, by the anchor-cell transceiver node, the primary-link portion of the information to the mobile device via the primary link;
    routing, by the anchor-cell transceiver node, the secondary-link portion of the information to the mobile device via the secondary link of the secondary-cell transceiver node; and
sending, by the anchor-cell transceiver node, a refresh indication for the secondary link to the secondary-cell transceiver node and the mobile device to prevent said expiration of said period of time,
wherein the anchor-cell transceiver node and the secondary-cell transceiver node are both wireless transceiver nodes.

2. The method as recited in claim 1, further comprising:
sending, by the anchor-cell transceiver node, a handoff indication triggering the secondary-cell transceiver node and the mobile device to perform a handoff of the mobile device to a new secondary-cell transceiver node.

3. The method as recited in claim 1, further comprising:
performing, by the anchor-cell transceiver node, Radio Link Control (RLC) processing for the primary link and the secondary link between the secondary-cell transceiver node and the mobile device.

4. The method as recited in claim 3, wherein the secondary-cell transceiver node communicates with the anchor-cell transceiver node to support the Radio Link Control (RLC) processing at the anchor-cell transceiver node for the secondary link between the secondary-cell transceiver node and the mobile device.

5. The method as recited in claim 1, further comprising:
performing, by the anchor-cell transceiver node, Hybrid Automatic Repeat request (HARQ) processing for the primary link and the secondary link between the secondary-cell transceiver node and the mobile device.

6. The method as recited in claim 5, wherein the secondary-cell transceiver node communicates with the anchor-cell transceiver node to support the Hybrid Automatic Repeat request (HARQ) processing at the anchor-cell transceiver node for the secondary link between the secondary-cell transceiver node and the mobile device.

7. The method as recited in claim 1, wherein the secondary-cell transceiver node performs all physical layer processing for the secondary link between the secondary-cell transceiver node and the mobile device.

8. A method of wireless communication comprising:
communicating, by a mobile device with an anchor-cell transceiver node, via a primary link;
receiving, by the mobile device from the anchor-cell transceiver node, an indication for the mobile device and a secondary-cell transceiver node to establish a secondary link for a period of time until expiration;
communicating, by the mobile device with the secondary-cell transceiver node, via the secondary link, wherein both the primary link and the secondary link are concurrently active wireless links;
monitoring, by the mobile device, the primary link and the secondary link for information sent by the anchor-cell transceiver node and the secondary-cell transceiver node, respectively;
simultaneously receiving, by the mobile device, a primary-link portion of the information via the primary link and a secondary-link portion of the information via the secondary link, the primary-link portion of the information being different than the secondary-link portion of the information; and
receiving, by the mobile device from the anchor-cell transceiver node, a refresh indication for the secondary link to prevent said expiration of said period of time,
wherein the anchor-cell transceiver node and the secondary-cell transceiver node are both wireless transceiver nodes.

9. The method as recited in claim 8, further comprising:
monitoring a candidate set of secondary-cell transceiver nodes for possible communications from any of the secondary-cell transceiver nodes in the candidate set.

10. The method as recited in claim 8, further comprising:
receiving, by the mobile device from the anchor-cell transceiver node, an indication for the secondary-cell transceiver node and the mobile device to perform a handoff of the mobile device to a new secondary-cell transceiver node.

11. The method as recited in claim 8, further comprising:
monitoring, by the mobile device, both the primary link and the secondary link until occurrence of,
    the secondary link expiring without being refreshed, or
    a handoff of the mobile device to a new secondary link of a new secondary-cell transceiver node being performed.

* * * * *